United States Patent

Snow

[15] 3,701,296
[45] Oct. 31, 1972

[54] APPARATUS FOR CUTTING STRIPS FROM VEHICLE TIRES

[72] Inventor: James A. Snow, Route 3, Box 405, Gadsden, Ala. 35901

[22] Filed: Feb. 18, 1971

[21] Appl. No.: 116,489

[52] U.S. Cl. ........................82/54, 82/58, 82/83, 82/91, 82/101, 157/13
[51] Int. Cl. ..................................B23b 5/14
[58] Field of Search ..................82/53, 46, 90–92, 82/83, 4 E, 101, 58, 54; 157/13

[56] References Cited

UNITED STATES PATENTS

| | | |
|---|---|---|
| 1,971,582 | 8/1934 | Scruby ..........................82/4 E |
| 1,916,258 | 7/1933 | Errig et al. ....................82/4 E |
| 1,753,827 | 4/1930 | Glasser et al. ................82/91 |
| 1,406,459 | 2/1922 | King ..............................82/91 |

Primary Examiner—Leonidas Vlachos
Attorney—Jennings, Carter & Thompson

[57] ABSTRACT

Apparatus for cutting an elongated strip from the tread of a vehicle tire having rotating cutters spaced from each other the width of the strip to be cut. Roller is mounted for movement toward and away from cutters with axis of roller being parallel to axis of rotation of cutters. Roller is adapted to enter tire and engage opposite side of tread from side thereof engaged by cutters to force the tread into cutting relation with cutters and impart rotary motion to tire being cut.

7 Claims, 3 Drawing Figures

PATENTED OCT 31 1972

3,701,296

INVENTOR.
James A. Snow
BY
Jennings, Carter & Thompson
Attorneys

3,701,296

APPARATUS FOR CUTTING STRIPS FROM VEHICLE TIRES

BACKGROUND OF THE INVENTION

This invention relates to apparatus for cutting elongated strips from the tread of vehicle tires and more particularly to such apparatus which cuts annular strips of resilient material from the tread of the tire whereupon the annular strip is then cut transversely to provide an elongated strip of resilient material for use as a supporting surface for articles being transported. That is, the elongated strips of resilient material are secured to the supporting surfaces of transporting vehicles, such as trailers or the like whereby the articles being transported rest on the resilient strips.

Heretofore in the art to which my invention relates, difficulties have been encountered in cutting annular strips of resilient material from the tread of vehicle tires due to the fact that no effective means has been provided for supporting the tire being cut and imparting rotation thereto during the cutting operation. It is very difficult to cut annular strips from the tread of a vehicle tire by hand due to the fact that such an operation is not only time consuming but it is difficult to cut the tread along straight lines.

BRIEF SUMMARY OF THE INVENTION

In accordance with my invention, I provide apparatus for cutting annular strips from the tread of a tire wherein cutters are mounted for rotation in spaced relation to each other a distance equal the width of the strip to be cut. A movable roller is mounted for movement toward and away from the cutters with the axis of rotation of the roller being parallel to the axis of rotation of the cutters. The roller is of a size and shape to enter the tire and engage the opposite side of the tread from the side thereof engaged by the cutters so that the tread is forced into cutting relation with the cutters and rotary motion is imparted to the tire being cut, whereby the annular strip of resilient material is cut in a straight line with one continuous operation.

Apparatus embodying features of my invention is illustrated in the accompanying drawing, forming a part of this application, in which.

Figure 3:
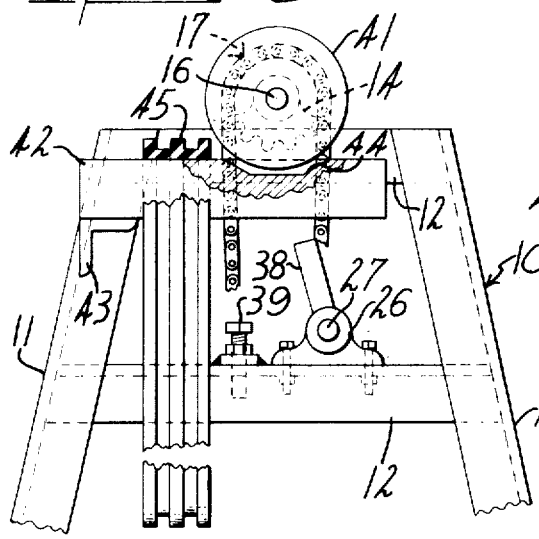

Referring now to the drawing for a better understanding of my invention, I show a supporting frame 10 having upwardly and inwardly extending supports 11. The supports 11 at each side of the frame 10 are connected to each other by transverse frame members 12, as shown. Also, suitable frame members 13 extend from one side of the frame to the other, as shown in FIG. 2.

Mounted for rotation in bearing units 14 at the top of the frame 10 is an elongated shaft 16. A sprocket and chain drive indicated generally at 17 operatively connects the shaft 16 to a power shaft 18. As shown in FIG. 2, the power shaft 18 is operatively connected to a motor 19 by a speed reducer 21 whereby the shafts 18 and 16 are driven at a slower speed than the rotational speed of the motor 19.

Mounted adjacent one end of the shaft 16 are a pair of disc-like cutters 22 which are spaced from each other a distance equal the width of the strip of resilient material to be cut from the tread 23 of a tire 24.

Figure 1:
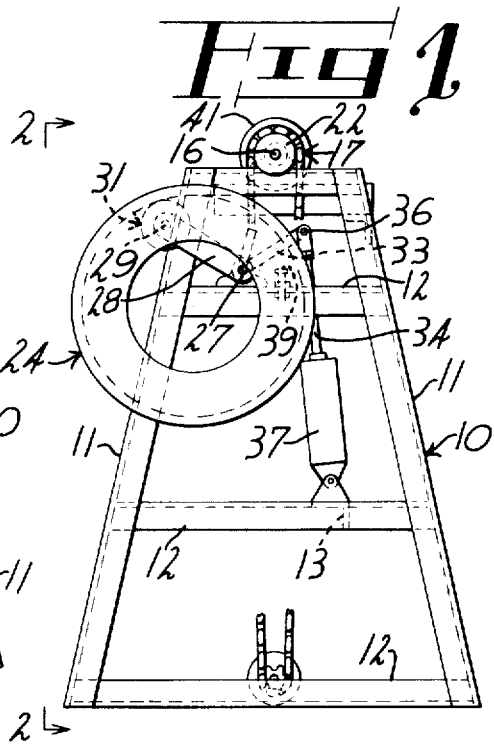
FIG. 1 is a side elevational view showing a tire being supported by the supporting roller prior to engagement with the rotary cutters.
Figure 2:
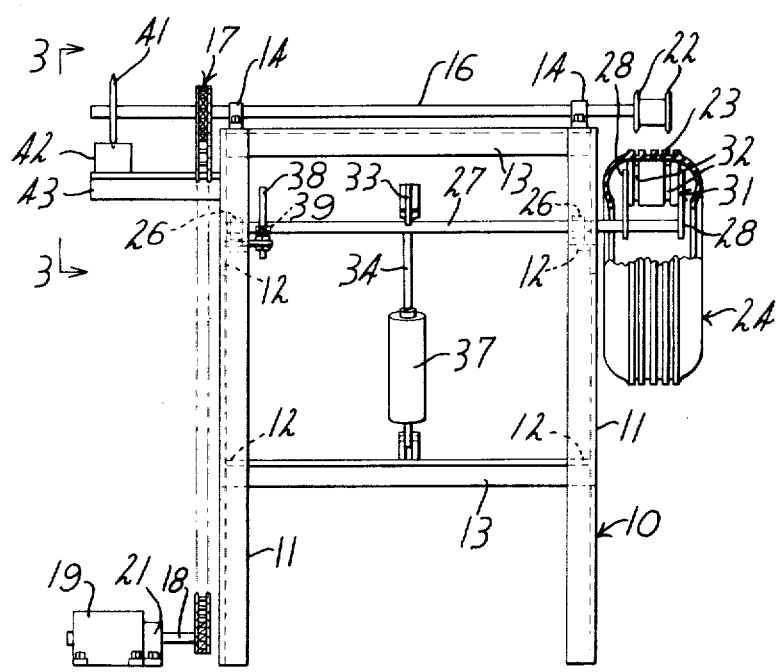
FIG. 2 is a side elevational view, partly broken away and in section, taken generally along the line 2—2 of FIG. 1; and, FIG. 3 is an enlarged, fragmental view, partly broken away and in section, taken generally along the line 3—3 of FIG. 2.

Mounted for rotation in suitable bearings 26 carried by the frame 10 is an elongated shaft 27 which extends parallel to the shaft 16, as shown in FIG. 2. Secured rigidly to the shaft 27 are a pair of spaced apart arms 28. The outer ends of the arms 28 carry a transverse shaft 29 therebetween, as shown in FIG. 1. Mounted for rotation on the shaft 29 between the free ends of the arms 28 is a roller 31 having its axis of rotation parallel to the axis of rotation of the disc-like cutters 22. Preferably, the roller 31 is of a length greater than the distance between the disc-like cutters 22 and is provided with annular grooves 32 which are spaced from each other and are in alignment with the disc-like cutters 22 whereby the periphery of the cutters 22 are adapted to enter the annular grooves 32 upon movement of the roller 31 toward the disc-like cutters 22.

The roller 31 is of a size and so constructed that it is adapted to enter a vehicle tire 24 and engage the opposite side of the tread 23 from the side thereof engaged by the disc-like cutters 22 to thus force the tread into cutting relation with the cutters 22 and at the same time impart rotation to the tire 24 upon movement of the roller 31 toward the cutters 22 with the tire 24 therebetween. Accordingly, upon movement of the arms 28, together with the roller 31 toward the cutters 22, an annular strip of the tread 23 is cut by the cutters 22 and rotary motion is imparted to the tire 24 to thus cut the annular strip with one continuous operation.

To impart rotation to the shaft 27 whereby the arms 28 and the roller 31 move toward and away from the cutters 22, I secure one end of an arm 33 rigidly to the shaft 27 with the other end of the arm 33 being pivotally connected to a piston rod 34 by a pivot pin 36. The piston rod 34 is operatively connected to a conventional type fluid pressure operated cylinder 37 whereby upon introducing fluid under pressure into opposite ends of the cylinder 37, the arms 28 move in opposite directions. To limit rotation of the shaft 27 in a direction to move roller 31 toward cutters 22, I mount an outwardly projecting stop member 38 on the shaft 27 in position to engage an adjustable, stationary stop member 39.

Mounted adjacent the end of the shaft 16 opposite the end thereof carrying the cutters 22 is a disc-like cutter 41. A support member 42 is carried by an outwardly projecting bracket 43 which in turn is rigidly secured to the frame 10, as shown in FIGS. 2 and 3. The support member 42 extends beneath the disc-like cutter 41 in position to guide an annular strip 45 which has been cut from the tread 23 of tire 24 into engagement with the cutter 41. That is, the annular strip of resilient material is moved transversely toward the cutter 41 whereby a transverse cut is made through the annular strip 45. A recess 44 is provided in the upper surface of the support member 42 in position to receive the periphery of the cutter 41, as shown in FIG. 3.

From the foregoing description, the operation of my improved apparatus for cutting a strip of resilient material from the tread of a vehicle tire will be readily understood. The tire 24 is mounted on the roller 31, as shown in FIGS. 1 and 2, whereby the roller 31 enters the tire and engages the opposite side of the tread 23 from the side thereof to be engaged by the cutters 22. Fluid under pressure is then introduced into the cylinder 37 to retract the piston rod 34 and thus move the arms 28 and the roller 31 toward the cutters 22. The force of the roller 31 against the inner surface of the tread 23 not only forces the tread into cutting relation with the cutters 22 but also imparts rotation to the tire 24 whereby the cut is made with a continuous movement of the tire. Accordingly, the force of the roller 31 against the inner surface of the tread 23 brings about a cutting of the tread 23 as the rollers 22 rotate relative thereto.

After the tire 24 and the tread 23 carried thereby have made a complete revolution relative to the cutters 22 with the roller 31 forcing the tread into cutting relation with the cutters, the strip 45 is completely severed from the tire 24 whereupon it is then removed from the roller 31. The annular strip of material 45 is then moved over the free end of the support member 42, from right to left as viewed in FIG. 3, whereupon the strip 45 moves in a transverse direction into engagement with the cutter 41 whereby the strip 45 is cut transversely to form an elongated strip of resilient material which may then be attached to a supporting structure for supporting articles transported on the supporting structure.

While I have shown only two cutters 22 for cutting the annular strip of material 45, it will be apparent that more than one strip of material may be cut at a time. Also, while I have shown spaced apart arms 28 for supporting the roller 31, the roller 31 may be supported by one or more arms, as desired.

While I have shown my invention in but one form, it will be obvious to those skilled in the art that it is not so limited, but is susceptible of various other changes and modifications without departing from the spirit thereof.

What I claim is:

1. In apparatus for cutting a strip of resilient material from the tread of a vehicle tire comprising:
   a. a supporting frame,
   b. at least two disc-like cutters supported for rotation on said frame and spaced from each other a distance equal the width of the strip of material to be cut,
   c. means imparting rotation to said cutters,
   d. a roller mounted on said frame and adapted for movement toward and away from said cutters with the axis of said roller being parallel to the axis of rotation of said disc-like cutters,
   e. said roller being adapted to enter a vehicle tire to be cut and engage the opposite side of the tread of said tire from the side thereof engaged by said disc-like cutters to force said tread into cutting relation with said cutters and impart rotation to said tire upon movement of said roller toward said disc-like cutters with the tire therebetween whereby an annular strip of the tread is cut by said cutters as rotary motion is imparted to said tire, and
   f. power means to move said roller into and out of driving engagement with said opposite side of the tread of said tire.

2. Apparatus for cutting a strip of resilient material from the tread of a vehicle tire as defined in claim 1 in which said roller is of a length greater than the distance between said disc-like cutters and annular grooves are provided in said roller for receiving the peripheral edges of said disc-like cutters.

3. Apparatus for cutting a strip of resilient material from the tread of a vehicle tire as defined in claim 1 in which said roller is mounted for rotation at one end of at least one arm with the other end of said arm being mounted for pivotal movement whereby said one end is adapted to move toward and away from said cutters, and said power means is operatively connected to said arm for moving said arm relative to said cutters and said opposite side of the tread of said tire.

4. Apparatus for cutting a strip of resilient material from the tread of a vehicle tire as defined in claim 3 in which said other end of said arm is carried by a shaft which is mounted for rotation on said supporting frame.

5. Apparatus for cutting a strip of resilient material from the tread of a vehicle tire as defined in claim 4 in which said shaft is operatively connected to a fluid pressure operated cylinder so that said shaft is rotated an angular distance upon actuation of said cylinder.

6. Apparatus for cutting a strip of resilient material from the tread of a vehicle tire as defined in claim 5 in which a stop member is carried by said shaft in position to engage a stationary stop carried by said frame to limit rotation of said shaft.

7. Apparatus for cutting a strip of resilient material from the tread of a vehicle tire as defined in claim 6 in which said disc-like cutters are mounted adjacent one end of a shaft which is mounted for rotation on said frame, with another disc-like cutter mounted adjacent the other end of said shaft and a support member is carried by said frame beneath said another cutter for supporting and guiding a strip of resilient material transversely into engagement with said another cutter, there being a recess in said support member for receiving the periphery of said another cutter.

* * * * *